3,317,336
PROCESS FOR COATING UNPRIMED METAL WITH POLYVINYL FLUORIDE
Alexander W. Kennedy, Mayfield Heights, and Michael E. Kucsma, Painesville, Ohio, assignors to Diamond Alkali Company, Cleveland, Ohio, a corporation of Delaware
No Drawing. Filed Apr. 17, 1963, Ser. No. 273,550
6 Claims. (Cl. 117—132)

The present invention relates to an improved process for attaining adhesion of polyvinyl halide coatings to substrates. More particularly, the present invention relates to an improved method of coating substrates with polyvinyl halides characterized by excellent adherence to the substrate without upsetting other desired characteristics of the coating.

Polyvinyl halide resins have found extensive use in the lacquer and coating fields because of their combination of desirable properties, for example, coatings and lacquers of polyvinyl halide exhibit resistance to atmospheric elements, to chemicals, water and most solvents; they are free of odor, taste, and toxicity; they are strong, flexible and tough, and they also possess high finish and durability.

In general, polyvinyl halide resins may be applied to substrates either as solution coatings or as dispersions. Solution coatings are characterized by a low-solids content, e.g., generally less than about 25%, by weight, of low molecular weight polyvinyl halide resins generally not exceeding a molecular weight of 10,000, or copolymers of vinyl halide resins with other vinyl monomers, dissolved in a volatile organic solvent to give a solution low in solid content. These solutions are applied to various surfaces and the solvent is evaporated by air-drying or by applying moderate temperatures.

Solutions of polyvinyl resins have been used to coat various surfaces such as wood, textile and paper with a thin lacquer or varnish type film; however, on application to smoother surfaces such as on metals and heating the coating at a moderate temperature, inadequate adhesion results. At higher temperatures, while somewhat better adherence results, numerous concomitant disadvantages follow, including a tendency of the resin to disintegrate. Generally, solution coatings display well-recognized deficiencies because of their lack of toughness, durability and tensile strength which characterize the high molecular weight resins obtained in dispersion coating fields.

In contrast to solution coatings, dispersions of polyvinyl halides are characterized by high molecular weight polyvinyl halide resins, dispersed in various organic media up to a solids content of about 70% by weight. For instance, high molecular weight polyvinyl halides have been dispersed in latent solvents, namely organic liquids which have no appreciable solvent action for the polyvinyl halide at temperatures below about 90° C., but show solvent action for it at higher temperatures. The latent solvents are relatively volatile since, in general, their boiling point is between about 90° and 300° C., at atmospheric pressure, and preferably between about 125° and 200° C. Preferably they are substantially removed by heating at 200° C. or less for about 20 minutes. During this heat treatment, water and any volatile non-solvent is removed and the polymer particles are subjected to the action of an increasing concentration of latent solvent at a temperature at which the solvent is an effective solvent. As the heating is continued, the latent solvent evaporates leaving the polyvinyl halide as a coalesced homogeneous-shaped structure essentially free from latent solvent and any other liquid phase of the original dispersion. The rate of heating is such that the latent solvent evaporates without boiling. This serves to bring the temperature of the polymer clusters up while there is still solvent present.

Also, high molecular weight polyvinyl halide resins have been used as dispersions in a liquid plasticizer which is a non-volatile and non-solvent for the high molecular weight polyvinyl halide resin at room temperature, while being a solvent for the resin at elevated temperatures. Such colloidal dispersions are called "plastisols." The term "plastisol" refers to a colloidal dispersion or suspension of a solid, particulate polyvinyl halide resin in a non-volatile liquid plasticizer which is a poor solvent for the resin at ordinary temperatures, as in the range of 25° to 60° C., but which dissolves the resin at elevated temperatures, as above 75° C., thereby forming a solid gel in which the resin and plasticizer remain completely compatible on cooling. Prior to heating, the plastisols are pastes, which are flowable and which can be molded, slushed, or spread onto any desired substrate.

Plastisols which contain an additional liquid diluent, which is characterized by being compatible with the plasticizer, and in which the polyvinyl resin is suspended, are known as organosols. The diluent is preferably volatile at curing temperatures. Organosols, utilizing suitable diluents such as the hydrocarbons, have a high resin content and at the same time a workable fluidity.

Latent solvents, plastisols and organosols have been used in dispersion coatings to cover articles by application of the resin suspension to the surface followed by a heating at high temperature whereby the solvent evaporates and coalescence occurs. However, quite unlike the thin lacquer or solution type, the coatings from dispersions totally lack adhesion to smooth surfaces, such as metals, notwithstanding heating at elevated temperatures. This lack of adherence to the substrate surface has posed a serious problem to the coating industry. Attempts have been made to circumvent this problem by priming the metal before application of the polyvinyl halide resin. The primer is often one or more resins which, although having improved adhesion to the metal, is deficient with respect to the necessary properties for a coating; hence, a primer requires the application of a layer of polyvinyl halide over it. Recently a method has been proposed whereby an etching treatment precedes the application of a thermoplastic adhesive film. It is clear that the use of primers, or of adhesive layers for metal, is relatively expensive because of the necessary material and labor involved. Accordingly, the coating industry has long been searching for a coating which would dispense with a primer, and various attempts have been made to overcome the problem.

In accordance with the present invention, a process has been discovered whereby a polyvinyl halide resin, particularly polyvinyl fluoride, gives a coating possessing remarkable adhesion upon applying the resin and heating the applied material on the substrate, particularly a smooth-surface substrate, in a particular manner described hereinbelow. The present invention provides for coating various substrates with a polyvinyl halide resin by direct application to the substrate and heating the applied polyvinyl halide to elevated temperatures under a controlled heat treatment in a specific manner to produce coatings which possess excellent adherence to substrates and particularly possess an outstanding tenacity to smooth unprimed surfaces such as metals. Moreover, the coatings provided by this invention are flexible, tough, and chemically inert. A particular, valuable aspect of the invention is a metal article of manufacture from which the coatings of this invention are not strippable with a knife. Their degree of hardness and flexibility may be modified as desired to best suit the type of substrate and the ultimate application intended therefor.

Coated articles, characterized by high tenacity to unprimed surfaces of the coated article, are prepared by the process of the present invention by applying vinyl halide polymer onto the surface of the substrates which are to be coated by any suitable procedure designed to give a coating of the thickness desired; and then heat-curing the applied vinyl halide polymer under controlled conditions involving an initial heat step to vaporize the solvent, if a latent solvent is used, or at a temperature sufficient to gel the applied coating, if a liquid plasticizer is used. After the initial heat-curing step, which leaves the polyvinyl halide on the substrate as a coalesced or gelled, homogeneous-shaped structure, essentially free of any liquid phase of the original dispersion or solution, the coated substrate is then subjected to a high temperature post-cure, conducted at a temperature of at least about 50° F. above the initial heat-curing treatment for a period of time of from about 30 seconds up to about 10 or more minutes. Specifically, the coated substrate is subjected to an initial heating step at a temperature up to about 400° F. for a period of time of about 30 seconds up to about 5 minutes, preferably up to about 2½ minutes. The initial heat-treating step will, of course, depend upon the liquid in which the polyvinyl fluoride has been dispersed. For instance, when a latent solvent is used, temperatures up to about 325° F. are used; whereas when a liquid plasticizer is used, temperatures up to about 400° F. or more may be used before the polyvinyl fluoride is essentially free of any liquid phase of the original dispersion. The post-cure is generally conducted at a temperature of at least about 50° F., higher than the initial heat-curing step, but at a temperature insufficient to cause undesirable disintegration of the polyvinyl halide resin on the substrate. For best results, the post-cure is generally conducted at temperatures of about 300° to about 550° F., preferably 400° to 525° F. for about 30 seconds up to about 10 or more minutes, preferably up to about 5 or more minutes.

In accordance with the method of the present invention, the thermoplastic vinyl halide polymers refer to those polymers preferably containing a predominant quantity, i.e. at least about 90% of vinyl halide units. The preferred coating composition comprises a homopolymer of of vinyl fluoride. Other monomers may be copolymerized in limited proportions with the vinyl halide; for instance, the vinyl-type monomers such as, for example, vinylidene chloride, vinyl chloroacetate, chlorostyrene, chlorobutadiene, etc., and those copolymers of such vinylidene compounds and other unsaturated materials copolymerizable therewith, for example, copolymers of vinylidene halide, such as vinylidene chloride, and vinyl esters of carboxylic acids, for example, vinyl acetate, vinyl propionate, vinyl butyrate, vinyl benzoate; esters of unsaturated acids, for example, alkyl acrylates, such as methylacrylate, ethylacrylate, propylacrylate, butylacrylate, allylacrylate, and the corresponding esters of methylacrylic acid; vinyl aromatic compounds; dienes; unsaturated amides; unsaturated nitriles; esters of alpha, beta unsaturated carboxylic acids; and phenyl esters of maleic, crotonic, itaconic, fumaric acid, and the like.

The polyvinyl halide, used in making the coating of this invention, can be prepared according to known methods such as by a bulk, solution, suspension, or dispersion polymerization method. The polyvinyl halides employed in the invention have a high molecular weight, as measured by the Staudinger method described in Industrial Engineering Chemistry, vol. 36, p. 1152 (1936), generally above 50,000, preferably possessing molecular weights up to about 300,000. The polyvinyl halide polymers should be in a finely divided state of subdivision. Generally, the polymers have a particle size of less than about 5 microns, preferably a size ranging between 0.05 and 1 micron.

The fluidity of the composition may vary greatly, depending on the type of application and method of application desired The amount of organic liquid is adjusted to give a fluid or sometimes viscous composition that is of suitable consistency for application to the substrate. This, of course, will vary greatly according to the manner of application; for instance, whether it is desired to spray the composition on the substrate, to dip the substrate into the composition; or to apply the composition on the substrate with some kind of roller system, as well as other factors like the temperature, the type of liquid dispersants employed, and the like. Generally, about 25 to 400 parts by weight of organic liquid per 100 parts of polymer are suitable, preferably about 50 to 200 parts organic liquid to the weight of polymer.

The polyvinyl halide may be applied onto the surface of the substrate, which is to be coated by any suitable procedure designed to give a coating of the thickness desired. The substrate may be coated by dipping into the polyvinyl halide, by spreading the polyvinyl halide onto the surface, by spraying, by rolling, by percolating the polyvinyl halide over or through the substrate, and by equivalent procedures. The dry coatings generally have a thickness of 0.5 to 20 mils. A great variety of substrates may be coated in accordance with this invention. Illustrations are materials like leather, cloth, resins, wood, stone, concrete and cement. The present coatings are of special interest for metals, since the problem of adhesion on unprimed metals has been so acute until the present discovery. Any metal may be coated with the present composition, including steel, aluminum, iron, magnesium and nickel, and any alloy thereof.

Besides the polyvinyl halide, the coating may contain plasticizers, pigments, fillers, stabilizers, fungicides, and other additives necessary to meet specifications of industry.

In order that those skilled in the art may more completely understand the present invention and the preferred methods by which the same may be carried into effect, the following specific examples may be offered:

EXAMPLE 1

A sample of alodized aluminum, chromate-treated aluminum (Alodine 1200–S, supplied by Amchem), is preheated to 325° F. and then coated with a 20% by weight solution of polyvinyl fluoride in dimethyl acetamide. The temperature is maintained at 325° F. for 2 minutes. The polyvinyl fluoride coating is water-white and very slightly translucent. The adhesion of the coating to the substrate is very poor. It could easily be peeled from the aluminum.

EXAMPLE 2

Example 1 is repeated, except that the coated sheet, after curing for 2 minutes at 325° F. is then subjected to a 2-minute post-cure at 450° F. The coating composition has the same appearance as before, except for a higher gloss at the surface. The adhesion is now found to be excellent. The polyvinyl fluoride coating can not be cleanly chipped, scraped or peeled from the substrate at the coating-aluminum interface.

Further tests are conducted on the post-cured aluminum coated strip prepared in Example 2 to test the adhesion of the polyvinyl fluoride coating between the coating and the substrate. The following tests are conducted according to specifications of U.S. Steel Corp. Applied Research Laboratory, covering the minimum requirements to qualify a polyvinyl halide system for use on the vinyl coating line of U.S. Steel.

*Detergent-salt moisture resistance test*

A strip of the post-cured polyvinyl fluoride-coated aluminum strip, prepared by the method of Example 2, is subjected to the static salt-detergent test which comprises immersing a coated sample in a 140° F. solution of ¼ percent salt and 2 percent detergent ("All"). After 400 hours in the moisture-resistant detergent-salt test, no undercutting or delamination is observed along a cross-scored line on the coating.

Salt spray moisture resistance test

Another sample of the polyvinyl fluoride coated aluminum strip, prepared by the method of Example 2 and heat-cured by the process of the present invention, is subjected to salt spray resistant test (ASTM D–117). This test comprises preparing cross-scored panels of the polyvinyl fluoride coated aluminum and exposing these panels to a 5-percent neutral salt fog for a period of 96 hours. After 340 hours a maximum 1/16-inch undercut is noticed along approximately 40 percent of the length of the score-line with no blistering and only a slight loss of adhesion.

Water immersion test

Another sample of the polyvinyl fluoride coated aluminum strip, heat-cured by the method of the present invention, is placed in distilled water maintained at 70° F. After 1,000 hours in the distilled water, no loss of adhesion is observed and no undercut is noticed along a cross-scored line on the coating.

Polyvinyl fluoride coated aluminum, prepared by the method of Example 2, is subjected to the Reverse Bend, Reverse Dimpling, and Reverse Impact tests. The adhesion of the polyvinyl fluoride coating composition to the aluminum strip is excellent after each and every one of these tests. Also, after each of the above strips is subjected to the Detergent-Salt, Salt Spray, Water Immersion, Reverse Bend, Reverse Dimpling, and Reverse Impact tests, the polyvinyl fluoride coating is subjected to the well-known Scotch tape test. Each of the treated samples passes this test, indicating excellent adhesion of the post-cured polyvinyl fluoride to the substrate surface.

EXAMPLES 3–7

Aluminum and steel strips are coated with polyvinyl fluoride and heat-treated according to the process of the present invention. The results are given in Table I below.

EXAMPLE 8

Example 1 is repeated, except that the coated sheet, after curing for two minutes at 325° F. is then subjected to a five-minute post-cure at 365° F. The polyvinyl fluoride coating is water-white and slightly translucent. The adhesion of the coating to the substrate is very poor. The coating is readily peeled from the aluminum.

EXAMPLE 9

Example 8 is repeated, except that the post-cure treatment is conducted at 365° F. for 10 minutes. The adhesion of the coating to the substrate remains poor and is readily peeled from the aluminum.

EXAMPLE 10

Example 1 is repeated except that the coated sheet, after curing for two minutes at 325° F. is then subjected to a ten-minute post-cure at 385° F. The adhesion of the polyvinyl fluoride coating is now found to be excellent. The polyvinyl fluoride coating cannot be scraped or peeled from the substrate at the coating-aluminum interface. Even when the post-cure time is reduced to five minutes at 385° F., the adhesion of the polyvinyl fluoride to the aluminum substrate remains good and is not readily peeled from the aluminum.

It is to be understood that, although the invention has been described with specific reference to particular embodiments thereof, it is not to be so limited, since changes and alterations therein may be made which are within the full intended scope of this invention as defined in the appended claims.

It is claimed:

1. A process of coating an unprimed metal substrate which comprises applying to said substrate a coating of polyvinyl fluoride, heating said applied polyvinyl fluoride coating at a temperature sufficient to coalesce the applied polyvinyl fluoride on said substrate, heating said coalesced polyvinyl fluoride at a temperature at least 50° F. above that necessary to coalesce said applied polyvinyl fluoride for a period of time up to about 10 minutes.

2. The process of claim 1 wherein the initial heat-treating step is conducted at a temperature up to about 400° F., sufficient to coalesce the applied polyvinyl fluoride coating.

3. The process of claim 1 wherein heating of the coalesced polyvinyl halide is conducted at a temperature at least 50° F. above that necessary to coalesce said applied polyvinyl fluoride and within the range of about 300° to 550° F.

4. The process of claim 3 wherein heat treatment of the coalesced polyvinyl fluoride is conducted at a temperature at least 50° F. above that necessary to coalesce said applied polyvinyl fluoride and within the range of about 400° to 525° F.

5. A process of coating an unprimed metal substrate which comprises applying to said substrate a coating of polyvinyl fluoride, heating said applied polyvinyl fluoride coating at a temperature up to about 400° F., sufficient to coalesce said applied polyvinyl fluoride on said substrate, heating said coalesced polyvinyl fluoride at a temperature at least 50° above that necessary to coalesce said applied polyvinyl fluoride and within the range of about 300° to 550° F. for a period of time up to about five minutes.

6. The process of claim 5 wherein heating of the coalesced polyvinyl fluoride is conducted at a temperature at least 50° above that necessary to coalesce said applied polyvinyl fluoride and within the range of about 400° to 525° F.

TABLE I

| Ex. | Substrate | Type of Coating | Polyvinyl Fluoride Content | Initial Cure | | Post-Cure | | Adhesion |
|---|---|---|---|---|---|---|---|---|
| | | | | Minutes | Temp., °F. | Minutes | Temp., °F. | |
| | ALUMINUM | | | | | | | |
| 3 | (A) Alodized [1] | Solution | 20% in Dimethyl acetamide | 2 | 325 | 2 | 500 | Excellent. |
| 4 | (B) Alodized | do | do | 2 | 325 | 2 | 450 | Good +. |
| 5 | (C) Alodized | Dispersion | do | 1½ | 350 | 5 | 400 | Do. |
| | STEEL | | | | | | | |
| 6 | (A) Galvanized [2] | Solution | do | 2 | 325 | 2 | 520 | Excellent. |
| 7 | (B) Cold Roll [2] | do | do | 2 | 325 | 1¼ | 520 | Do. |

[1] Chromate-treated, supplied by Q-panel Co.
[2] Phosphate-treated, supplied by U.S. Steel.

(References on following page)

References Cited by the Examiner

UNITED STATES PATENTS

| | | | |
|---|---|---|---|
| 2,274,616 | 2/1942 | Raynolds | 117—132 X |
| 2,419,010 | 4/1947 | Coffman et al. | 260—92.1 X |
| 2,427,513 | 9/1947 | Spessard. | |
| 2,853,531 | 9/1958 | Cleaver | 117—132 |
| 2,990,294 | 6/1961 | Long | 117—75 |
| 3,050,412 | 8/1962 | Coe | 117—132 X |

WILLIAM D. MARTIN, *Primary Examiner.*

T. G. DAVIS, *Assistant Examiner.*